G. W. Putnam,
Spice Box,

No. 65,430.   Patented June 4, 1867.

Witnesses.
Theo Tusche
J. A. Service

Inventor.
G H Putnam
Per Munn & Co
Attorneys

United States Patent Office.

GEORGE W. PUTNAM, OF PETERBORO, NEW YORK.

Letters Patent No. 65,430, dated June 4, 1867.

---

IMPROVED DREDGING-BOX.

---

*The Schedule referred to in these Letters Patent and making part of the same.*

---

TO ALL WHOM IT MAY CONCERN:

Be it known that I, GEORGE W. PUTNAM, of Peterboro, in the county of Madison, and State of New York, have invented a new and improved "Sprinkling or Dredging-Vessel;" and I do hereby declare that the following is a full, clear, and exact description thereof, which will enable others skilled in the art to make and use the same, reference being had to the accompanying drawings, forming part of this specification.

The present invention relates to a vessel for the sprinkling or dredging of salt, pepper, and other condiments, spices, flour, sugar, and other pulverized or powdered articles or substances of whatsoever nature, provided with an operating valve and a central horizontal division, forming compartments in the vessel, and having the outlet openings on its side, whereby a new and useful device is formed, as will be hereinafter more fully described.

Figure 1:
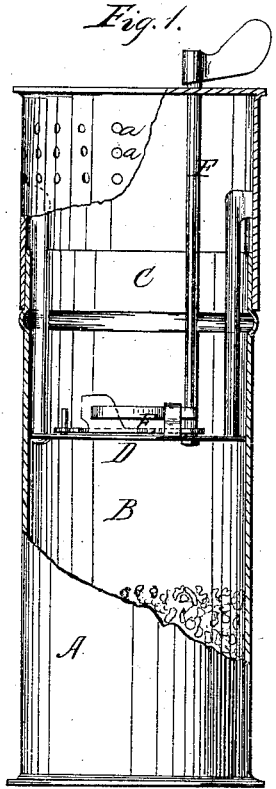

Figure 1 is a side elevation of my improved sprinkling or dredging-vessel, broken out upon its side to show its interior construction.

Figure 6:
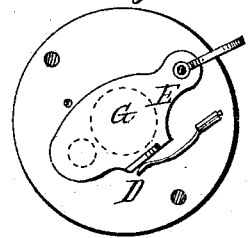

Figure 6, a detail view of the vessel shown in fig. 1.

Similar letters of reference indicate like parts.

A, in the drawings, represents a vessel, which may be of any desired shape, whether square, round, or oval, or with one portion round and another square, or with any other shape, in any of its parts or portions, which may be deemed suitable, the shape of the vessel forming no part of the present invention, or being intended in any way or manner to limit the application of the improvements embraced herein. In this vessel a series of perforations, a, is made for the discharge of the article contained therein, which perforations I make in the side or sides of the vessel, whether embracing more or less of their extent, either in the direction of the length of the vessel or in a direction about and around it, but terminating at a suitable point to allow sufficient space in the vessel below them for the vessel to hold or contain the desired or any requisite amount or quantity of the article for which it is designed to be used, as, for instance, salt, pepper, sugar, flour, &c. By making the perforations in the side of the vessel it is plainly obvious that to discharge the material contained in it therefrom it is only necessary to upset the vessel sufficiently to bring it over such perforations, through which it will freely pass, and with no obstruction or impediment, as in such case the passage of the material can be in no manner clogged or impeded by the portion of the material remaining in the box or vessel, from the fact that the weight of the material in the box is not over or upon that portion of it which is in position to pass out through the perforations, and consequently cannot serve to bed or press it against the same, but, on the contrary, leaves it free to escape as desired. The side perforations of the vessel may be in the top or cover or cap to the vessel, or in the body or main portion of the same; the principle of this invention, as well also as its operation and effect, being the same in either case. In order to enable a stated or definite quantity of material to be discharged from the vessel, I divide such vessel into two chambers or compartments, B and C, by a cross partition, D, with the upper one of which the perforations communicate, in combination with a valve-plate, E, so arranged upon the partition D, and operated by a lever-handle, F, extending outside of the vessel, that, by moving such handle in the proper direction, the said valve-plate can be so swung as to open the hole G in the partition-plate D to the passage of the material through it, from the lower chamber to the upper, to any amount desired, when, releasing the lever F, the valve will close, and the said communication be thus cut off.

Having thus described my invention, what I claim as new, and desire to secure by Letters Patent, is—

The sprinkler, consisting of the vessel A, having valve E and cross-partition D, forming compartments B C, substantially as described.

GEORGE W. PUTNAM.

Witnesses:
JAMES BARNETT,
CALEB CALKINS.